United States Patent [19]
Veit-Holger

[11] Patent Number: 4,966,536
[45] Date of Patent: Oct. 30, 1990

[54] FILM BLOWING LINE WITH ROLL
[76] Inventor: Karl Veit-Holger, Nürnberger Stasse 119, D-8700 Würzburg, Fed. Rep. of Germany
[21] Appl. No.: 288,006
[22] Filed: Dec. 21, 1988
[30] Foreign Application Priority Data
Dec. 23, 1987 [DE] Fed. Rep. of Germany ....... 3743721
[51] Int. Cl.⁵ ............................................. B29C 47/92
[52] U.S. Cl. .................................. 425/72.1; 264/40.1; 425/141; 425/144; 425/145
[58] Field of Search ................. 425/72.1, 326.1, 387.1, 425/140, 141, 144, 145; 264/40.1

[56]        References Cited
         U.S. PATENT DOCUMENTS
3,286,302  11/1966  Doering ..................... 425/326.1 X
4,189,288   2/1980  Halter ........................... 425/72.1
4,244,897   1/1981  Moon ........................... 425/141 X
4,246,212   1/1981  Upmeier et al. .............. 425/72.1 X
4,339,403   7/1982  Upmeier et al. .............. 425/144 X
4,464,319   8/1984  Halter et al. .................. 425/140 X
4,594,063   6/1986  Reifenhauser et al. ......... 425/141
4,699,580  10/1987  Co ................................. 425/72.1

FOREIGN PATENT DOCUMENTS
779093  11/1980  U.S.S.R. ............................. 425/141

Primary Examiner—Richard L. Chiesa
Attorney, Agent, or Firm—Edwin D. Schindler

[57]                 ABSTRACT

A film blowing line is disclosed which includes a winding roll to receive a folded film; the film having initially been tubular in shape. In the invention, the diameter of the winding roll is measured in an axial direction and, correspondingly, the thickness can be controlled with the aid of an actuating member, as a rule, differentially across the circumference of the tubular film.

4 Claims, 1 Drawing Sheet

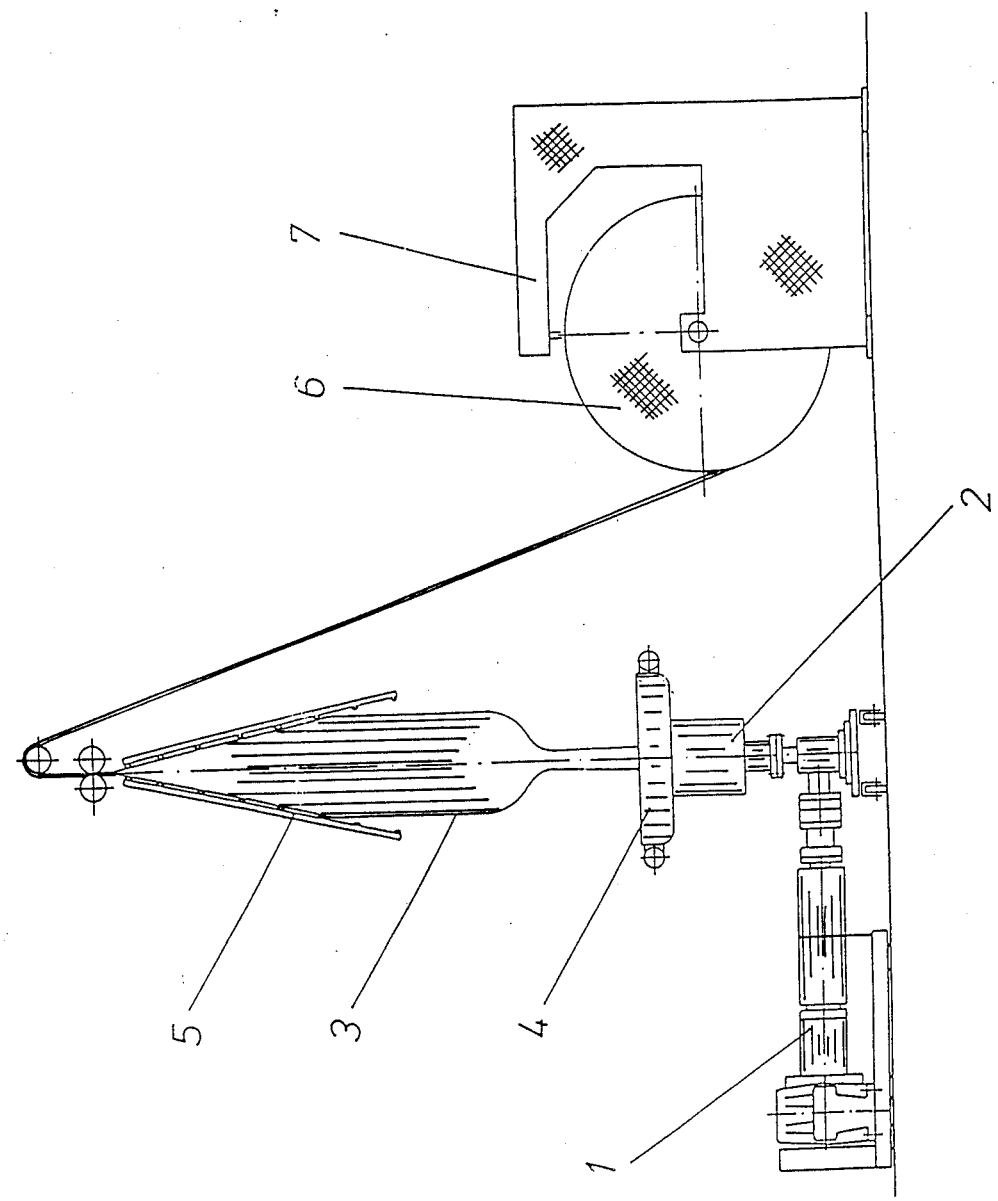

FILM BLOWING LINE WITH ROLL

The present invention relates to a film blowing line having a roll. More particularly, the present invention relates to a film blowing line having a roll to receive film: the film initially being tubular in configuration and later folded.

Film blowing lines are knoWn to the art and serve in the manufacture of tubular plastic film which is first produced With the aid of a blow head and is then stretched while still in a hot, or heated state, to reduce wall thickness. The film is then laid flat when it eventually reaches a cooled final state and is then wound on a roll. Another possibility for use of a film blowing line of the pertinent technical field of art includes the separation of the tubular film and subsequent rolling to effect the folding For various reasons, these tubular films have different thicknesses across their circumferences. Deviations in thicknesses from the average value amount to, at least, 10% exist, even with careful adjustments. Upon direct winding of the film onto the roll, different winding radii form so that the obtained diameter is a function of the roll axis. These types of rolls, having differing radii, are unusable for subsequent processing.

As a means for overcoming the disadvantages inherent in the prior art, differing measures are presently available to the state of the art. Nevertheless, the state of the art devices suffer from a common disadvantage which is their high cost resulting from certain constructional and design requirements. Accordingly, the manufacturing of prior art devices is very cost or capital intensive.

It is, thus, known that by rotation of the extrusion means that it is possible to achieve the effect that the different thicknesses of the tubular films are successively distributed over the overall width so that, seen integrally, the same diameter is produced over the length of the roll. Approximately, the same effect can be achieved if the die itself, or the subsequent lay-flat device, into which the tubular film is transferred in a plane, is rotated at approximately uniform rotational velocity. Nevertheless, a major disadvantage common to all of these prior art processes is that the varying wall thicknesses of the film is not eliminated, but is successively distributed over the roll on account of the rotation.

Accordingly, it is an object of the present invention to further develop the foregoing type of film blowing line. More particularly, it is an object of the invention to provide that the diameter of the roll, together with the wall thicknesses of the film, is made more uniform.

The foregoing and related objects are achieved by the present invention wherein the diameter of the roll, measured in an axial direction, and consequently the thickness, which generally varies across the circumference of the tubular film, is controlled with the aid of an actuator.

More specifically, the present invention s concerned with sensing the thickness of the film, and especially the deviation over the width, by measurement of the (external) diameter of the roll in the axial direction. The value for the diameter produces a measure for the thickness of the film, or its deviation, respectivelY; the measuring point with reference to the axis of the roll and the location of the deviations with respect to the width of the film The measured value can thereby be used to generate a control signal, which is transmitted to an actuator which, in turn, influences the thickness of the film at the manufacturing stage. Since different diameters are generally determined in the longitudinal direction of the roll, the influence on the individual points of the circumference of the tubular film varies To a first approximation, a proportional relationship exists between the roll diameter in dependence on the roll axis and the thickness across the circumference of the tubular film. In this way, a purposeful influencing of the film thickness is possible, and none of the distribution over the longitudinal axis of the roll, that is conventional in the state of the art, is necessary.

The advantages which are thereby attained by the present invention are decisive in two respects: On one hand, the manufacturing costs for this kind of film blowing plant are much lower because of the elimination of the rotatory arrangement of certain components. On the other hand, a uniform wall thickness over the complete width of the film is achievable for the first time.

The manner in which the concrete influence on the thickness of the film during manufacture is performed is, in principle, free within the scope of the present invention. Several possibilities are conceivable here: The actuator can be used to adjust the output rate of the polymer individually across the circumference.

In a concrete embodiment, this is done by adjusting the die gap and/or by the temperature in the mold. The die gap permits a direct influencing of the output rate. The temperature affects the flowability and orientation capacity of the film in the sense that a higher temperature increases both the flowability and orientation capacity during the flow phase, so that an effect on the wall thickness is possible. Conversely, reduction of the temperature requires an increase of the wall thickness.

Another possibility for influencing the thickness of the film includes controlling the stretching and extension taking place after the blow head. The already finished tubular film is adjusted to different temperatures across its circumference only after the blow head, thereby allowing the air-cooling located there to produce differing cooling capacities over its circumference. For this, the air-cooling ring is variably adjusted according to the measured values, for example, by it being subdivided into sectors and the flow rate of the different sectors differentially adjusted.

Another conceivable possibility concerns an influencing of the cooling capacity of the air-cooling ring, which essentially comprises two discs located at a distance apart so that at least one of such discs is elastic and its respective capacity is influenced by a large number of positioning motors located around its circumference, and adjusted according to the measured values. It should be noted that by differential cooling in an annular area across the circumference of the tubular film, the temperature, and thereby the stretching, is influenced. Here, too, a higher temperature means a higher stretching capacity, and consequently a reduced film thickness. Different temperatures and different stretching capacities result from different throughput rates across the circumference of the air-cooling ring, which with suitable control, produces a uniform thickness of the film across the complete circumference In an especiallY preferred embodiment, it is proposed during the measurement of the diameter to exert a pressure against the roll. In this manner, loose and tight windings can be identified and taken into account in the evaluation and control of the actuating member. The pressure can, for example, be generated by pressing the measuring sensor itself against the roll, and the diameter registered when a certain Pressure value is reached. On the other hand, the roll could be pressed together in one direction and the diameter in this region can be determined by a separately inserted measuring device by optical means. Independent of a loose or tight winding a diameter for the roll is obtained which is determined, essentially, only by the film thickness.

Another possibility serving the same end comprises making a radial density measurement in addition to registering the diameter of the roll the result of which is also a measure of the loose or tight winding. The density measurement can be made ultrasonically without limiting the generalitY.

Other possibilities will be readily conceivable to the skilled artisan and are within the scope of the present invention.

Other details, features and advantages of the present invention can be taken from the following description wherein an illustrative embodiment of the present invention is explained in greater detail with the aid of the accompanying drawing figure.

BRIEF DESCRIPTION OF THE DRAWING

In the drawing figure, a film blowing line, in accordance with the present invention is schematically diagramed.

DETAILED DESCRIPTION OF THE DRAWING

In a generally known manner, the film blowing line of the present invention includes an extruder 1, serving to convey a plastic material, and a blow head 2, connected directly thereto. This serves for the manufacture of, and as the starting point for, a tubular film 3, expanding vertically upward. An air cooling ring 4 is located on blowing head 2.

Starting from blowing head 2, film 3 moves through air-cooling ring 4, expands to larger diameters and is thereby cooled down and is folded in a hardened stat e by means of a folding system 5. From there, the film (3) passes in a now planar state to a winding roll 6.

The diameter of winding roll 6 is sensed by a measuring device 7 (which fact cannot be concluded from the drawing). Measuring device 7 is movable vertically to the plane of the drawing so that the roll diameter can be recorded as a function of the axis of winding roll 6 and registered. It is advantageous, if during the measurement of the diameter, a pressure is applied in the area of the measuring path to the film wound on roll 6 in the direction of the center axis so that loose and/or tight windings can be compensated for and so that a single value, determined by the thickness of film 3, may be obtained for the diameter.

As a result an economical film blowing line is obtained with the aid of which plastic films of uniform thickness across the width may be manufactured.

While only several embodiments of the present invention have been shown and described, it will be obvious to those of ordinary skill in the art that many modifications may be made to the present invention without departing from the spirit and scope thereof.

What is claimed is:

1. A film blowing line with a winding roll, comprising:
   an extruder serving to convey a film of plastic material;
   a blow head connected to said extruder;
   an air-cooling ring located on said blow head;
   means for folding said film, said folding means being positioned downstream of said air cooling ring;
   said winding roll having a longitudinal axis and positioned to receive said film from sand means for folding;
   means for measuring the diameter of said roll, including said film of plastic material along said longitudinal axis, said means for measuring including means for controlling the thickness of said roll responsive to said measuring means.

2. The film blowing line according to claim 1, wherein said means for measuring includes an actuator for adjusting an emergence rate of the plastic material across the circumference.

3. The film blowing line according to claim 1, wherein said means for measuring includes an actuator for changing a die gap in a mold.

4. The film blowing line according to claim 1, wherein said means for measuring includes an actuator for changing a temperature in a mold.

* * * * *